(12) United States Patent
Chang et al.

(10) Patent No.: US 10,083,498 B2
(45) Date of Patent: Sep. 25, 2018

(54) COMPENSATION METHOD FOR DISPLAY DEVICE AND RELATED COMPENSATION MODULE

(71) Applicant: NOVATEK Microelectronics Corp., Hsin-Chu (TW)

(72) Inventors: Kuei-Chung Chang, Hsinchu County (TW); Shang-I Liu, Kaohsiung (TW); Pu-Hsien Chang, Hsinchu (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 28 days.

(21) Appl. No.: 15/051,673

(22) Filed: Feb. 24, 2016

(65) Prior Publication Data

US 2017/0243331 A1 Aug. 24, 2017

(51) Int. Cl.
*G09G 3/36* (2006.01)
*G06T 5/00* (2006.01)
*G06T 7/20* (2017.01)
*G06T 9/00* (2006.01)

(52) U.S. Cl.
CPC ............... *G06T 5/003* (2013.01); *G06T 7/20* (2013.01); *G06T 9/00* (2013.01); *G09G 3/3648* (2013.01); *G06T 2207/20201* (2013.01); *G09G 2320/0252* (2013.01); *G09G 2320/106* (2013.01); *G09G 2340/0435* (2013.01)

(58) Field of Classification Search
CPC .... H04N 19/513; H04N 19/577; H04N 19/51; H04N 19/573; H04N 19/82; H04N 19/114; H04N 19/137; H04N 19/58; H04N 19/587; H04N 5/145; G06T 7/20; G06T 5/003; G06T 9/00; G09G 2320/106; G09G 2340/04
See application file for complete search history.

(56) References Cited

U.S. PATENT DOCUMENTS

2010/0271554 A1* 10/2010 Blume .................. G06T 7/246
348/699
2010/0283892 A1* 11/2010 Zhou ...................... H04N 5/145
348/441

* cited by examiner

*Primary Examiner* — Nelson Rosario
*Assistant Examiner* — Scott Au
(74) *Attorney, Agent, or Firm* — Winston Hsu

(57) ABSTRACT

A compensation method for a driving circuit of a display device includes generating a motion vector between a previous frame and a current frame subsequent to the previous frame; generating a first estimation frame according to the current frame and the motion vector; adjusting the first estimation frame according to the difference between the current frame and the first estimation frame, to generate a first overdrive frame; and inserting the first overdrive frame between the current frame and a next frame subsequent to the current frame.

9 Claims, 5 Drawing Sheets

COMPENSATION METHOD FOR DISPLAY DEVICE AND RELATED COMPENSATION MODULE

BACKGROUND OF THE INVENTION

1. Field of the Invention

The present invention relates to a compensation method for a driving circuit of a display device and related compensation module, and more particularly, to a compensation method capable of reducing motion blur of a display device and related compensation module.

2. Description of the Prior Art

A liquid crystal display (LCD) is a flat panel display which has the advantages of low radiation, light weight and low power consumption and is widely used in various information technology (IT) products, such as notebook computers, tablets, and mobile phones. An active matrix thin film transistor (TFT) LCD is the most commonly used transistor type in LCD families, and particularly in the large-size LCD family. A driving system installed in the LCD includes a timing controller, source drivers and gate drivers. The source and gate drivers respectively control data lines and scan lines, which intersect to form a cell matrix. Each intersection is a cell including crystal display molecules and a TFT. In the driving system, the gate drivers are responsible for transmitting scan signals to gates of the TFTs to turn on the TFTs on the panel. The source drivers are responsible for converting digital image data, sent by the timing controller, into analog voltage signals and outputting the voltage signals to sources of the TFTs. When a TFT receives the voltage signals, a corresponding liquid crystal molecule has a terminal whose voltage changes to equalize the drain voltage of the TFT, which thereby changes its own twist angle. The rate that light penetrates the liquid crystal molecule is changed accordingly, allowing different colors to be displayed on the panel.

Liquid crystal molecules in an LCD display have a relatively slow response. In reality, the driving system of the LCD often takes tens of milliseconds to adjust the voltages for controlling the directions of the liquid crystal molecules from one value to another. Under such a condition, the voltages for controlling the directions of the liquid crystal molecules may not be able to reach the target values within a frame period (e.g. within 16.7 ms), generating motion blur when the LCD displays dynamic images. In addition, the LCD utilizes a hold-type display mechanism, which holds voltages of the liquid crystal molecules in each frame period. Because of the visual persistence characteristic of the human eyes, the hold-type display mechanism is prone to the motion blur when the LCD displays the dynamic images. The motion blur downgrades the quality of displaying the dynamic images and becomes one of main issues of LCD. Thus, how to reduce the motion blur becomes a topic to be discussed.

SUMMARY OF THE INVENTION

In order to solve the above problem, the present invention provides a compensation method capable of reducing motion blur of a display device and related compensation module.

In an aspect, the present invention discloses a compensation method for a driving circuit of a display device. The compensation method comprises generating a motion vector between a previous frame and a current frame subsequent to the previous frame; generating a first estimation frame according to the current frame and the motion vector; adjusting the first estimation frame according to the difference between the current frame and the first estimation frame, to generate a first overdrive frame; and inserting the first overdrive frame between the current frame and a next frame subsequent to the current frame.

In another aspect, the present invention discloses a compensation module for a driving circuit in a display device. The compensation module comprises a storage unit, a motion estimation unit, a conversion unit, and an overdrive unit. The storage unit is utilized to contiguously output a previous frame, a current frame and a next frame of an input signal. The motion estimation unit is coupled to the storage unit and the input signal, and is utilized to generate a motion vector between the previous frame and the current frame. The conversion unit is coupled to the storage unit and the motion estimation unit, and is utilized to generate a first estimation frame according to the current frame and the motion vector and insert the first estimation frame between the current frame and the next frame. The overdrive unit is coupled to the storage unit and the conversion unit, and is utilized to generate a first overdrive frame by adjusting the first estimation frame according to differences between the current frame and the first estimation frame and to replace the first estimation frame by the first overdrive frame.

By adopting the compensation method and the compensation module of the present invention, the frame rate of the display device can be increased and the response time of the display device can be decreased. The motion blur generated when the display device displays the dynamic images is reduced, therefore.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
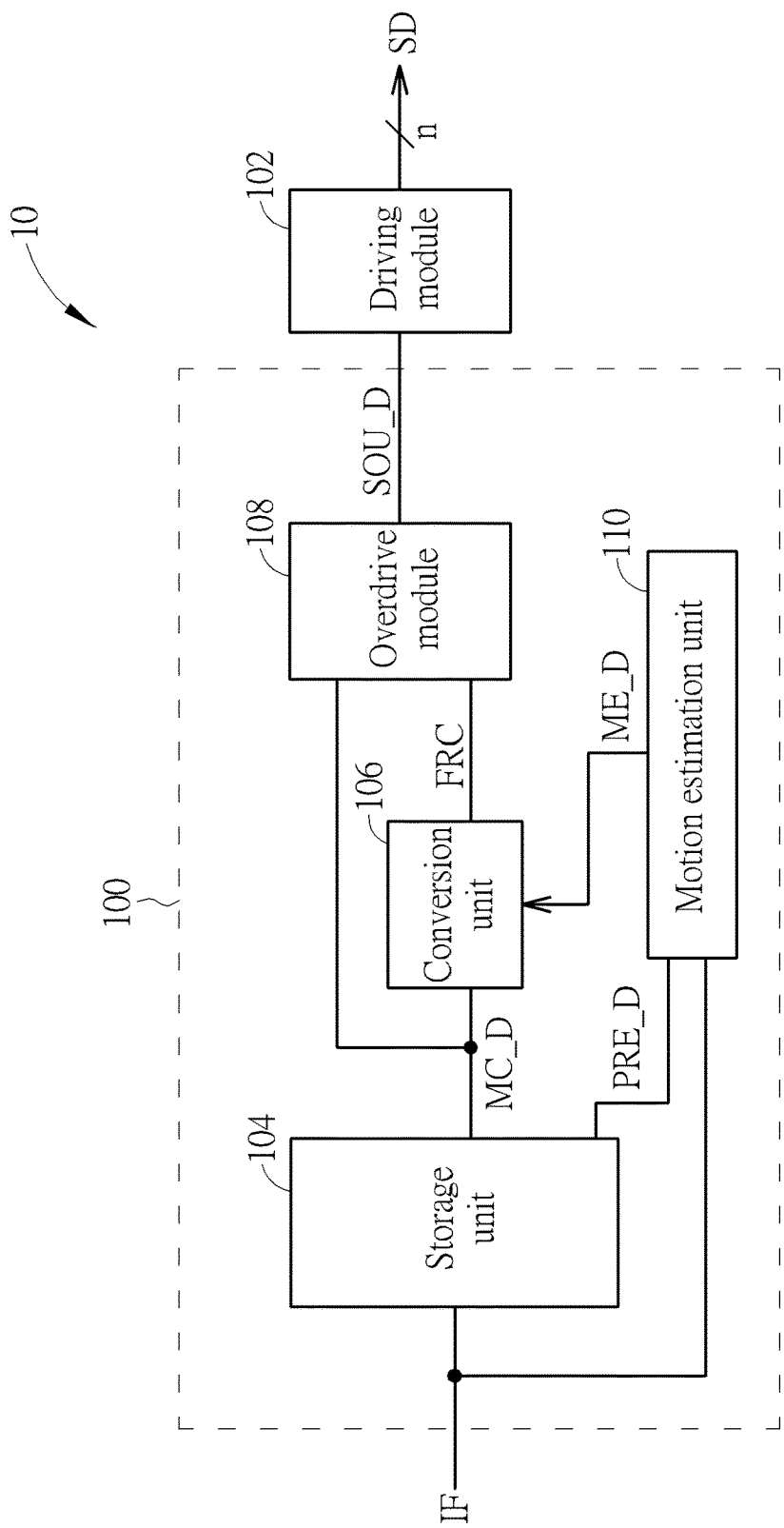
FIG. 1 is a schematic diagram of a driving circuit according to an example of the present invention.

Please refer to FIG. 1, which is a schematic diagram of a driving circuit 10 according to an example of the present invention. The driving circuit 10 may be a driver integrated circuit (IC) in an electronic product with the display function, such as a smart phone, a tablet, a television, and a liquid crystal display, and is not limited herein. As shown in FIG. 1, the driving circuit 10 comprises a compensation module 100 and a driving module 102. The compensation module 100 comprises a storage unit 104, a conversion unit 106, an overdrive unit 108 and a motion estimation unit 110, and is utilized to generate a source data signal SOU_D according to an input signal IF. According to the source data signal SOU_D, the driving module 102 generates source driving signals SD to display components in a display device (e.g. data lines in a panel, not shown in FIG. 1), to control the display device to display frames of the input signal IF. For example, the driving module 102 may be a source driver in the driver IC, and is not limited herein. In this example, the compensation module 100 detects movements of object moving from a previous frame to a current frame subsequent to the previous frame in the input signal IF. The compensation module 100 uses the detected movements to generate a frame inserted between the current frame and a next frame subsequent to the current frame and to adjust the next frame, so as to increase the flame rate of the source data signal SOU_D and reduce motion blur generated when the display device displays dynamic images.

When the compensation module 100 begins operating, the storage unit 104 stores a frame F1 (i.e. the previous frame) of the input signal IF. The storage unit 104 may be a memory whose size equal to the size of a single frame of the input signal IF, and is not limited herein. Next, the input signal IF contiguously transmits a frame F2 (i.e. the current frame) subsequent to the frame F1 to the storage unit 104 and the motion estimation unit 110. Before changing to store the frame F2, the storage unit 104 outputs the frame F1 to the motion estimation unit 110 via a previous data signal PRE_D and to the conversion unit 106 via a data signal MC_D. Note that, the frame rate of the data signal MC_D is twice the frame rate of input signal ID or the previous data signal PRE_D in this example. According to the previous data signal PRE_D and the input signal IF, the motion estimation unit 110 analyzes the movements of objects moving from the frame F1 to the frame F2 and accordingly generates a motion vector ME_12. For example, the motion vector ME_12 may comprise information of the directions and the displacements of the movements of the objects and the corresponding locations of the objects in each of the frames F2 and F3 subsequent to the frame F2. The motion estimation unit 110 indicates the motion vector ME_12 to the conversion unit 106 and the overdrive unit 108 via a motion estimation data signal ME_D.

After receiving the frame F2 and the motion vector ME_12, the conversion unit 106 estimates an estimation frame F2.5_1 between the frame F2 and a frame F3 according to the motion vector ME_12 and the frame F2. That is, the conversion unit 106 estimates the positions of the moving objects at a time between the frames F2 and F3 according to the movements of the objects moving from the frame F1 to F2 and the positions of the moving object in the frame F2, to generate the estimation frame F2.5_1. The conversion unit 106 then inserts the estimation frame between the frames F2 and F3. In order to decrease the response time of the display device adjusting the pixels values from the pixel values of frame F2 to those of the estimation frame F2.5_1, the overdrive unit 108 adjusts (e.g. overdrives) the estimation frame F2.5_1 according to the difference between the frame F2 and the estimation frame F2.5_1. For example, the overdrive unit 108 may adjust the pixel values in the frame F2.5_1 according to the differences between the pixel values at the corresponding positions in the frame F2 and the estimation frame F2.5_1. When the differences between the pixel values at the corresponding positions in the frames F2 and F2.5_1 are greater, the response time of changing the pixel values in the display device becomes greater. Thus, the overdrive unit 108 increases (e.g. overdrives) the pixel value in the estimation frame F2.5_1, which has greater difference with the pixel value at the corresponding positions in the frame F2, to shorten the response time. In an example, the overdrive unit 108 generates the overdrive frame F2.5_OD according to the pixel value differences between the frame F2 and the estimation frame F2.5_1 and a look-up table.

The conversion unit 104 further generates another estimation frame F2.5_2 according to the motion vector ME_12 and the frame F3. In other words, the conversion unit 104 estimates the positions of the moving objects at a time between the frames F2 and F3 according to the movements of the objects moving from the frame F1 to F2 (i.e. the motion vector ME_12) and the positions of the moving objects in the frame F3, to generate the estimation frame F2.5_2. Note that, the estimation frames F2.5_1 and F2.5_2 may be slightly different because the estimation frames F2.5_1 and F2.5_2 are generated according to the frames F2 and F3, respectively. According to the frame F3 and the estimation frame F2.5_2, the overdrive unit 108 adjusts the frame F3 (e.g. increases the pixel values in the frame F3) to shorten the response time of changing the pixel values from the pixel values of the estimation frame F2.5_2 to those of the frame F3 and accordingly generates an overdrive frame F3_OD to replace the frame F3. As a result, the frame rate of the source data signal SOU_D becomes twice the frame rate of the input signal IF and the response time between contiguous frames in the source data signal SOU_D is shortened. The motion blur generated when the display device displays the dynamic images is reduced, therefore. In addition, the size of the storage unit 104 is a frame size of the input signal IF because the storage unit 104 only needs to store a previously processed frame (e.g. the previous frame or the frame F1 in this example). The manufacture cost of the driving circuit 10 is decreased, therefore.

Figure 2A:
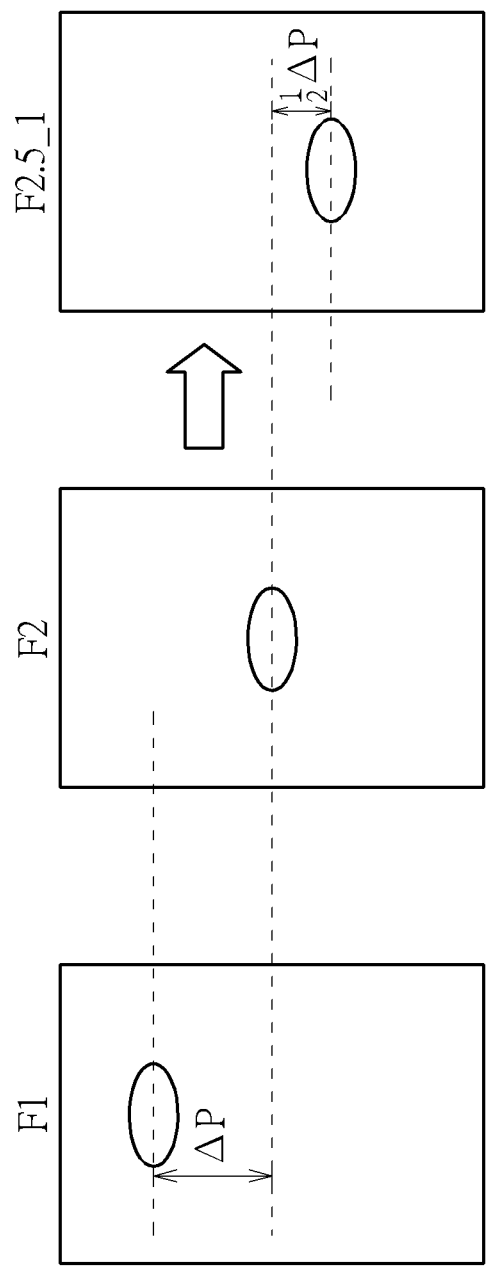
FIGS. 2A and 2B are schematic diagrams of related signals of the driving circuit shown in FIG. 1.
Figure 2B:
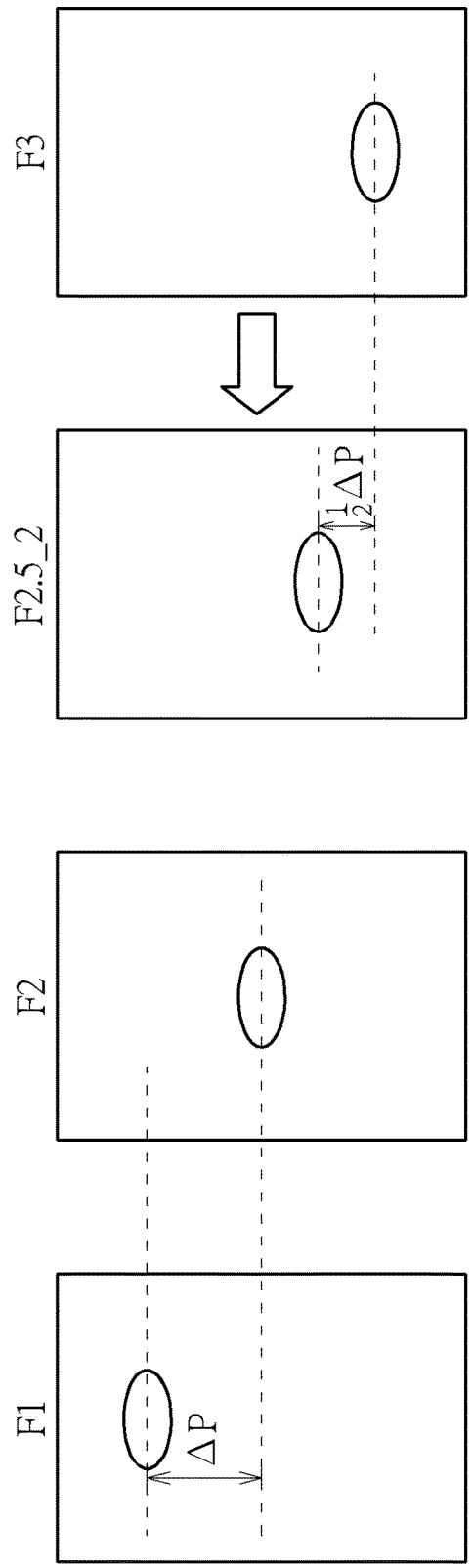

Please refer to FIGS. 2A and 2B, which are schematic diagrams of related signals of the driving circuit 10 shown in FIG. 1. As shown in FIG. 2A, an object moves downwardly from the frame F1 to F2 and the moving distance from the frame F1 to F2 is ΔP. In an example, the frames F1 and F2 are the contiguous images displayed by an electronic product such as a smart phone, a tablet and a laptop. From the frame F1 to F2, the user swipes screen in the downward direction and accordingly makes the object move the displacement ΔP. The motion estimation unit 110 detects the moving vector ME_12 (e.g. a downward moving vector whose value is ΔP) between the frames F1 and F2 and the conversion unit 106 generates the estimation frame F2.5_1 according to the frame F2 and the moving vector ME_12. In this example, the conversion unit 106 generates the estimation frame F2.5_1 by adjusting the object downwardly a displacement ½ΔP.

Similar to the object of the frames F1 and F2 shown in FIG. 2A, the object moves downwardly from the frame F1 to F2 and the moving displacement is ΔP. The motion estimation unit 110 detects the downward moving vector, whose value is ΔP, as the moving vector ME_12. In this example, the conversion unit 106 generates the estimation frame F2.5_2 according to the moving vector ME_12 and the frame F3. As shown in FIG. 2B, the conversion unit 106 acquires the estimation frame F2.5_2 by adjusting the position of the object in the frame F3 by the displacement ½ΔP. The overdrive unit 108 therefore can generate the overdrive frame F2.5_OD according to the frame F2 and the estimation frame F2.5_1 and generate the overdrive frame F3_OD according to the frame F3 and the estimation frame F2.5_2, to increase the frame rate of the source data signal SOU_D and to reduce the response time between the contiguous frames in the source data signal SOU_D.

Note that, the direction in which the object moves from the frame F1 to F2 (e.g. the direction of the user swipes the screen of the display device) may change in different situations. For example, the object may move in a horizontal direction (e.g. from left to right or from right to left), a vertical direction (e.g. from top to bottom or from bottom to top) or a diagonal direction (e.g. from left-top to right-bottom or from left-bottom to right-top), and is not limited herein.

Figure 3:
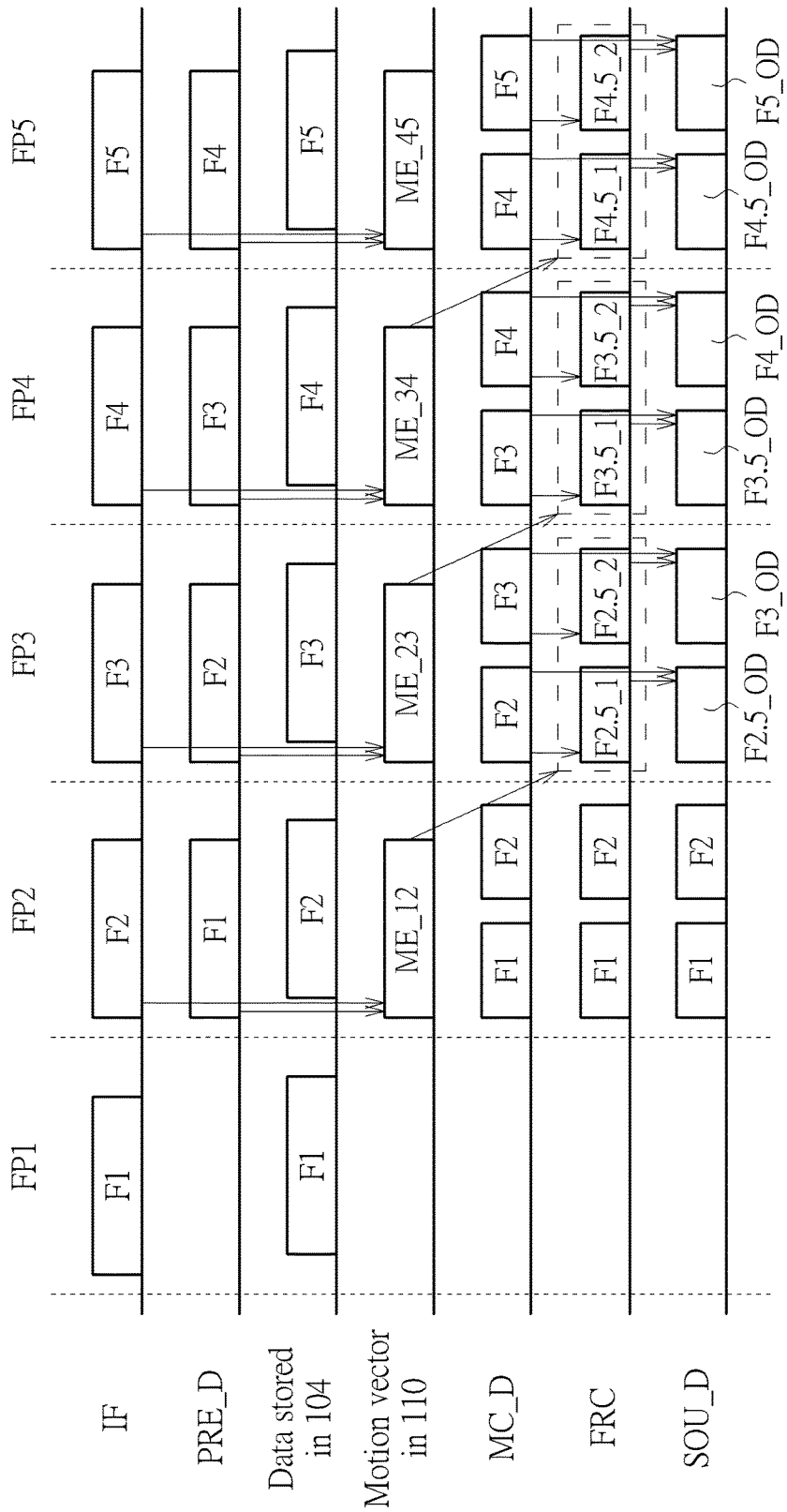
FIG. 3 is a timing diagram of related signals of the driving circuit shown in FIG. 1.

Please refer to FIG. 3, which is a timing diagram of related signals of the driving circuit 10 shown in FIG. 1. As shown in FIG. 3, the input signal IF transmits the frames F1 and F2 in contiguous frame periods FP1 and FP2. Before changing to store the frame F2 in the frame period FP2, the storage unit 104 outputs the frame F1 in the previous data signal PRE_D and the data signal MC_D. In the frame period FP2, the storage unit 104 contiguously outputs the frame f2 in the data signal MC_D to double the frame rate of the data signal MC_D. According to the frame F1 in the previous data signal PRE_D and the frame F2 in the input signal IF, the motion estimation unit 110 analyzes the movements of the objects from the frame F1 to F2 and generates the motion vector ME_12.

In a frame period FP3, the input signal IF transmits the frame F3 and the storage unit 104 contiguously outputs the frames f2 and F3 in the data signal MC_D. The conversion unit 106 generates the estimation frame F2.5_1 according to the frame F2 and the motion vector ME_12, and the overdrive unit 108 generates the overdrive frames F2.5_OD according to the frame F2 and the estimation frame F2.5_1. Further, the conversion unit 106 generates the estimation frame F2.5_2 according to the frame F3 and the motion vector ME_12, and the overdrive unit 108 generates the overdrive frames F3_OD according to the frame F3 and the estimation frame F2.5_2. Via repeating the abovementioned processes, the frame rate of the source data signal SOU_D becomes twice the frame rate of the input signal IF and the pixel values in the contiguous frames (e.g. F2.5_OD and F3_Od) are adjusted to shorten the response time of the displace device. The motion blur generated when the display device displays the dynamic images is therefore reduced.

Figure 4:
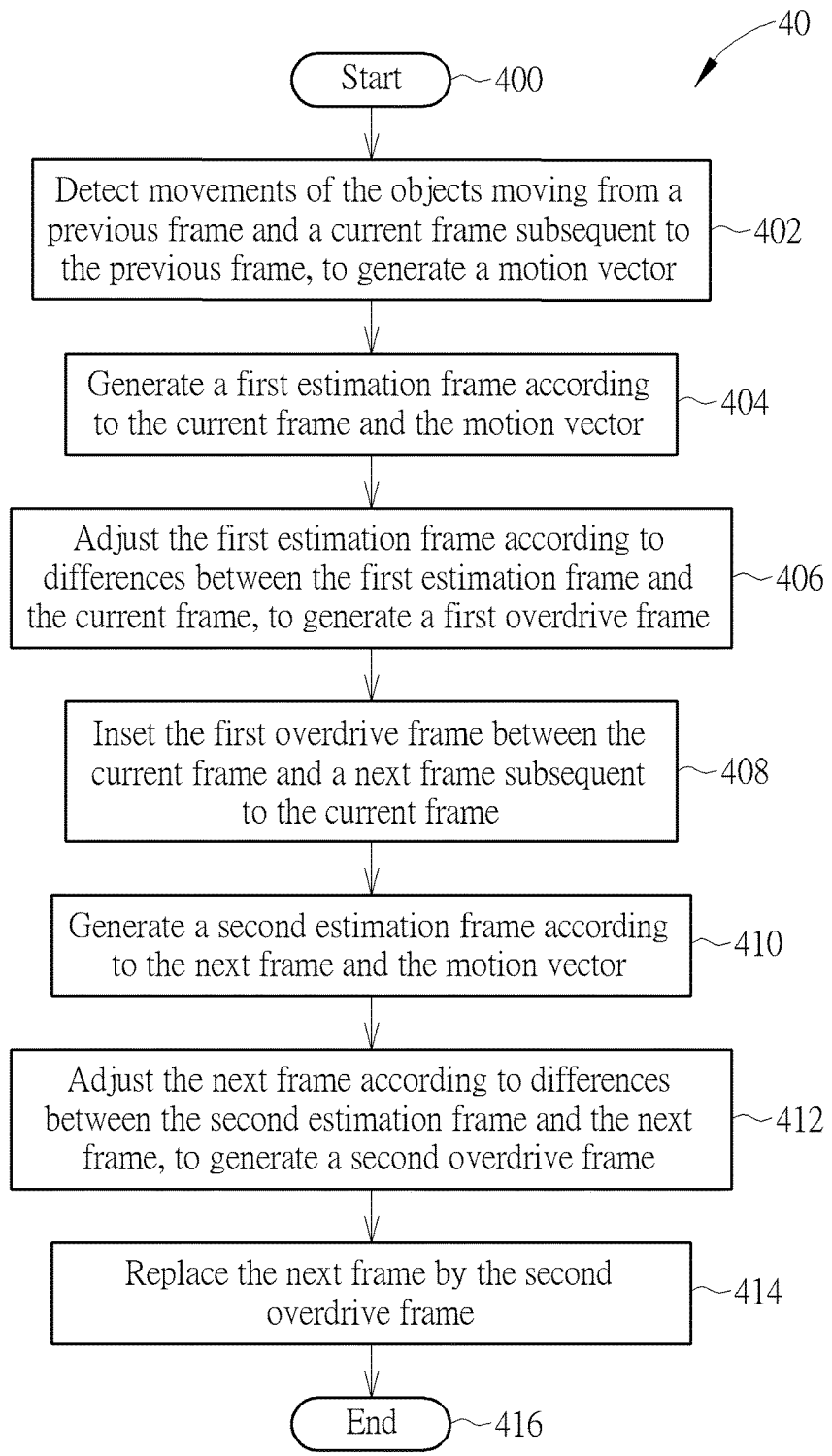
FIG. 4 is a flowchart of a compensation method according to an example of the present invention.

The process of the compensation module 100 generating the source data signal SOU_D can be summarized into a compensation method 40 shown in FIG. 4. The compensation method 40 is utilized in a driving circuit (e.g. a driver IC) of a display device and is utilized for increasing the frame rate of an input signal to generate a source data signal, wherein the source data signal indicates data corresponding to pixel values (e.g. voltages) of pixels in the display device. The compensation method 40 comprises:

Step 400: Start.
Step 402: Detect movements of the objects moving from a previous frame and a current frame subsequent to the previous frame, to generate a motion vector.
Step 404: Generate a first estimation frame according to the current frame and the motion vector.
Step 406: Adjust the first estimation frame according to differences between the first estimation frame and the current frame, to generate a first overdrive frame.
Step 408: Inset the first overdrive frame between the current frame and a next frame subsequent to the current frame.
Step 410: Generate a second estimation frame according to the next frame and the motion vector.
Step 412: Adjust the next frame according to differences between the second estimation frame and the next frame, to generate a second overdrive frame.
Step 414: Replace the next frame by the second overdrive frame.
Step 416: End.

According to the compensation method 40, the driving circuit analyzes movements of objects moving from a previous frame (e.g. the frame F1) to a current frame (e.g. the frame F2) in the input signal and accordingly generates a motion vector. According to different applications and design concepts, the motion vector may comprise different information. In an example, the motion vector comprises the directions and displacements of movements of the objects moving from the previous frame to the current frame and the locations of the moving objects in each of the current frame and a next frame (e.g. the frame F3) subsequent to the current frame. Next, the driving circuit estimates the locations of the moving objects according to the motion vector and the current frame, to generate a first estimation frame. In order to decrease the response time of the display device changing the pixel values from the current frame to the first estimation frame, the driving circuit generates a first overdrive frame by adjusting pixel values in the first estimation frame according to the differences between the pixel values at corresponding locations in the current frame and the first estimation frame and inserts the first overdrive frame between the current frame and the next frame.

Further, the driving circuit estimates the locations of the moving objects according to the motion vector and the next frame, to generate a second estimation frame. In order to shorten the response time of the display device changing the pixel values from the first overdrive frame to the next frame, the driving circuit generates a second overdrive frame by adjusting pixel values in the next frame according to the differences between the pixel values at corresponding locations in the second estimation frame and the next frame and replaces the next frame by the second estimation frame. Via adopting the compensation method 40, the driving circuit not only increases the frame rate of the input signal to generate the source data signal but also decreases the response times of the display device adjusting the pixels values between the contiguous frames. The motion blur generated when the display device displays the dynamic images is therefore reduced. The detailed operations of the compensation method 40 can be referred to the above and are not narrated herein for brevity.

The compensation module and the compensation method of the above examples estimate the frames subsequent to the current frame according to the motion vector between the current frame and the previous frame. According to the estimated frames, the compensation module and the compensation method can not only increase the frame rate of the source data signal displayed by the displace device but also decrease the response times of the display device. The motion blur generated when the display device displays the dynamic images is effectively reduced, therefore. In addition, since the storage utilized for storing frame data in the display device only needs to store a previous processed frame, the size of the storage unit is as small as a frame size of the input signal. Thus, the manufacture cost of the driving circuit is decreased.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A compensation method for a driving circuit of a display device, the compensation method comprising:
   storing a previous frame into a frame memory;
   receiving a current frame subsequent to the previous frame without storing the current frame into the frame memory when the previous frame is stored in the frame memory;

detecting movements of objects moving from the previous frame to the current frame, to generate a motion vector;

generating a first estimation frame according to the current frame and the motion vector;

increasing pixel values in the first estimation frame when the current frame and the first estimation frame have differences of pixel value greater than a determined value, to generate a first overdrive frame; and inserting the first overdrive frame between the current frame and a next frame subsequent to the current frame.

2. The compensation method of claim 1, wherein the motion vector comprises at least one of directions and displacements of movements of objects moving from the previous frame to the current frame and the corresponding locations of the objects in each of the current frame and the next frame.

3. The compensation method of claim 1, wherein the step of adjusting the first estimation frame according to the differences between the current frame and the first estimation frame to generate the first overdrive frame comprises:

adjusting the first estimation frame according to the differences between the current frame and the first estimation frame and a look-up table, to generate the first overdrive frame.

4. The compensation method of claim 1, further comprising:

generating a second estimation frame according to the next frame and the motion vector;

adjusting the next frame according to the difference between the second estimation frame and the next frame, to generate a second overdrive frame; and replacing the next frame by the second overdrive frame.

5. A compensation module, for a driving circuit in a display device, the compensation module comprising:

a storage unit, for storing a previous frame, wherein a current frame subsequent to the previous frame is not stored in the storage unit when the previous frame is stored in the storage unit;

a motion estimation unit, coupled to the storage unit, for receiving the previous frame and the current frame for detecting movements of objects moving from the previous frame to the current frame, to generate a motion vector;

a conversion unit, coupled to the storage unit and the motion estimation unit for generating a first estimation frame according to the current frame and the motion vector and inserting the first estimation frame between the current frame and a next frame subsequent to the current frame; and an overdrive unit, coupled to the storage unit and the conversion unit for generating a first overdrive frame by increasing pixel values in the first estimation frame when the current frame and the first estimation frame have differences of pixel value greater than a determined value and for replacing the first estimation frame by the first overdrive frame.

6. The compensation module of claim 5, wherein the motion vector comprises at least one of directions and displacements of movements of objects moving from the previous frame to the current frame and the corresponding locations of the objects in each of the current frame and the next frame.

7. The compensation module of claim 5, wherein the overdrive unit adjusts the first estimation frame according to differences between the current frame and the first estimation frame and a look-up table.

8. The compensation module of claim 5, wherein the conversion unit generates a second estimation frame according to the next frame and the motion vector, and the overdrive unit generates a second overdrive frame by adjusting the next frame according to differences between the next frame and the second estimation frame and replaces the next frame by the second overdrive frame.

9. The compensation module of claim 5, wherein a size of the storage unit is a frame size of the input signal.

* * * * *